US012663577B1

(12) United States Patent
Altekar et al.

(10) Patent No.: US 12,663,577 B1
(45) Date of Patent: Jun. 23, 2026

(54) LIGHTED KNOB

(71) Applicant: WHIRLPOOL CORPORATION,
Benton Harbor, MI (US)

(72) Inventors: Nikhil Rajiv Altekar, Sangli (IN);
Nikhil Sanjay Bhujbal, Pune (IN);
Zachary J. Bruin-Slot, Baroda, MI
(US); Devendra Bhaskar Shirore,
Pune (IN); Pradeep Shankar Thorat,
Stevensville, MI (US); **Vishal
Dhayagonde**, Stevensville, MI (US)

(73) Assignee: WHIRLPOOL CORPORATION,
Benton Harbor, MI (US)

( * ) Notice: Subject to any disclaimer, the term of this
patent is extended or adjusted under 35
U.S.C. 154(b) by 0 days.

(21) Appl. No.: 19/262,853

(22) Filed: Jul. 8, 2025

(51) Int. Cl.
*F21V 8/00* (2006.01)
(52) U.S. Cl.
CPC .................................. *G02B 6/0088* (2013.01)
(58) Field of Classification Search
CPC ..... G02B 6/0088; G02B 6/00; F21V 2200/00;
F21V 2200/15; F21V 33/00; F21V
33/0044; F21W 2131/30; F21W 2131/307
See application file for complete search history.

(56) References Cited

U.S. PATENT DOCUMENTS

| | | | |
|---|---|---|---|
| 8,801,206 B2 | 8/2014 | Chen et al. | |
| 10,147,571 B2 * | 12/2018 | Ebrom ................... | G05G 1/105 |
| 10,345,514 B2 * | 7/2019 | Kozinski ................ | F24C 7/082 |
| 11,567,525 B1 * | 1/2023 | Krueger ................ | G05G 1/105 |
| 11,913,631 B2 | 2/2024 | Lee | |
| 11,983,029 B2 * | 5/2024 | Lee ......................... | F24C 7/083 |
| 2021/0141410 A1 | 5/2021 | Spurrier et al. | |
| 2022/0178550 A1 * | 6/2022 | Krueger ................ | F24C 3/126 |

FOREIGN PATENT DOCUMENTS

TW          861972          11/2024

OTHER PUBLICATIONS

Suchy et al, "BMW IDrive Automotive HID Device in EFIS
Control," Czech Technical University in Prague, Praha, Czech
Republic (Oct. 5-9, 2014).

* cited by examiner

*Primary Examiner* — Bao Q Truong
(74) *Attorney, Agent, or Firm* — PRICE HENEVELD
LLP

(57) ABSTRACT
A backlight knob assembly provides light behind a knob on
an appliance. A light guide transfers light from a light source
in an encoder assembly in order to provide light behind the
knob. The backlight knob assembly is coupled to a surface
of the appliance with the encoder assembly being positioned
behind a surface of the appliance and the light guide
extending through an opening in the surface to the encoder
assembly.

20 Claims, 10 Drawing Sheets

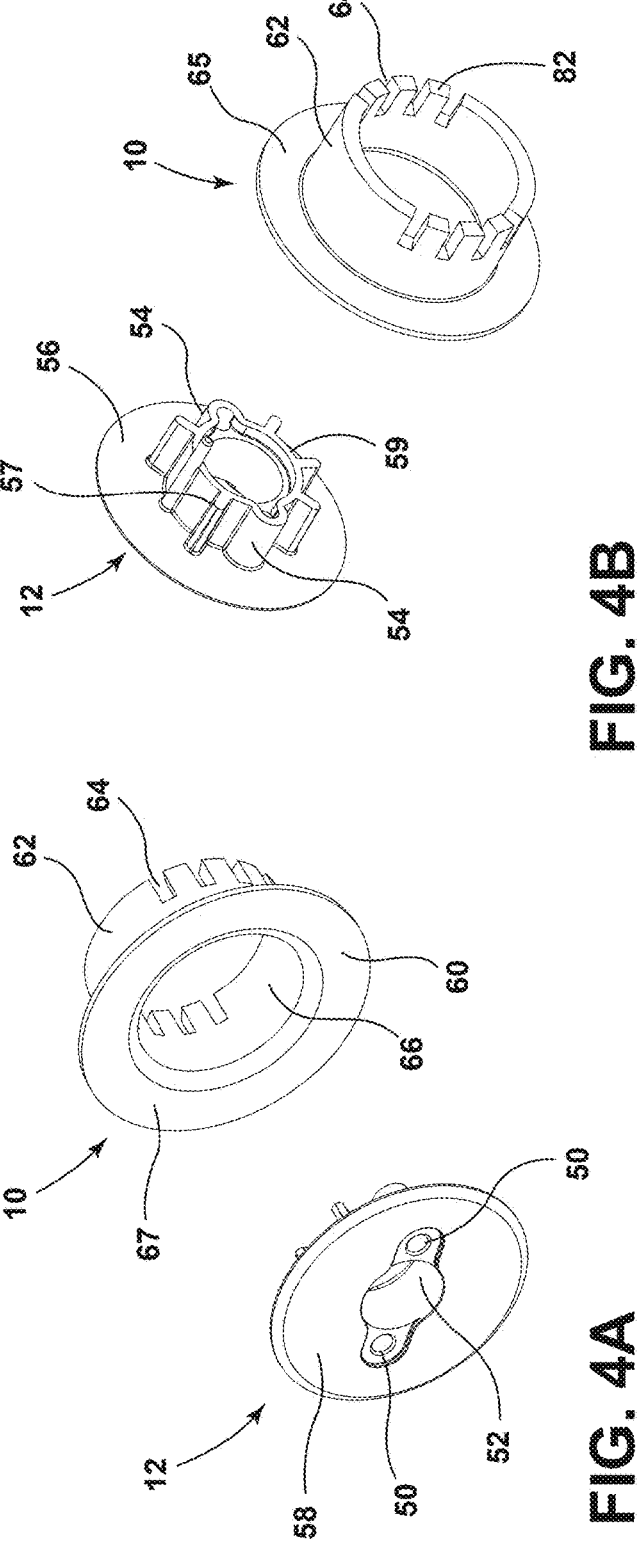
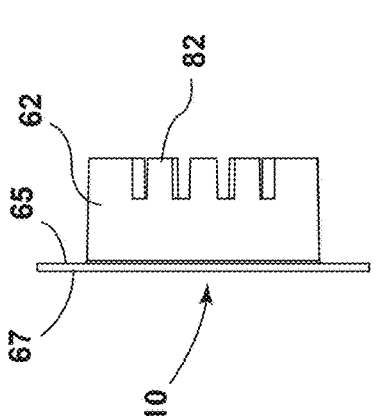
FIG. 4B
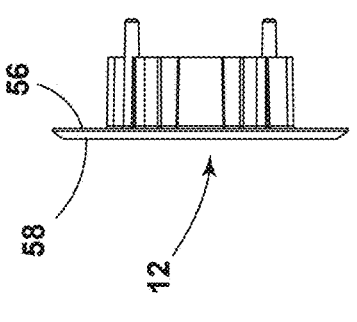
FIG. 4C
FIG. 4A

LIGHTED KNOB

BACKGROUND OF THE DISCLOSURE

The present disclosure generally relates to lighted knob for an appliance, and more specifically, to a backlight knob on an appliance console.

Knobs are used to turn on features of an appliance. Determining what the knob controls and what position the knob is in can be difficult in poor lighting. Thus, the appliance can have overhead lights or other lights that generally direct light toward a front surface of an appliance. However, such forward lighting of the appliance not only shines light on the knob, but can also illuminate other aspect of the appliance that are unnecessary to light. Thus, providing a backlight feature for a knob would allow the knobs to be lit, reducing the light added to the environment surrounding the appliance.

SUMMARY OF THE DISCLOSURE

One aspect of the present disclosure is a backlight knob assembly for an appliance. The backlight knob assembly has an encoder and light source positioned in an encoder assembly. The encoder assembly is coupled to an inside surface of the appliance adjacent to an opening. A light guide with an inner surface is positioned inside the opening in the surface of the appliance. The inner surface includes a plurality of slots with tabs positioned in between the plurality of slots. The tabs are received in tab openings in the encoder assembly. An outer encoder holder is positioned adjacent to an outer surface of the light guide. The outer encoder holder has a plurality of fastener openings and a central opening. One or more fasteners couples the outer encoder holder to the encoder assembly. A knob is coupled to a shaft on the encoder in the encoder assembly.

Another aspect of the present disclosure is an appliance with a backlight knob assembly. The appliance has a console coupled to the appliance with a light guide opening. An encoder and light source are positioned in an encoder assembly that is coupled to an inside surface of the console adjacent to the light guide opening. A light guide with an inner surface is positioned inside the opening in the appliance. The inner surface includes a plurality of tabs that are received in tab openings in the encoder assembly. The appliance has an outer encoder holder with a plurality of fastener openings. The outer encoder holder is positioned adjacent to an outer surface of the light guide. One or more fasteners couple the outer encoder holder to the encoder assembly. A knob is coupled to the encoder in the encoder assembly.

Yet another aspect of the present disclosure is a backlight knob assembly for an appliance. The backlight knob assembly has an encoder and light source positioned in an encoder assembly that is coupled to an inside surface of the appliance adjacent to a light guide opening. A light guide with an inner surface is positioned inside the light guide opening in the appliance. The inner surface of the light guide includes a plurality of tabs that are received in a plurality of tab openings in the encoder assembly. The backlight knob assembly has an outer encoder holder with a plurality of fastener openings. The outer encoder holder is positioned adjacent to an outer surface of the light guide, leaving an outer ring of the light guide exposed. One or more fasteners couple the outer encoder holder to the encoder assembly. A knob is coupled to the encoder.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 4A is a front perspective view of the light guide and outer encoder holder;

FIG. 4B is a rear perspective view of the light guide and outer encoder holder;

FIG. 4C is a side view of the light guide and outer encoder holder;

Figure 1:
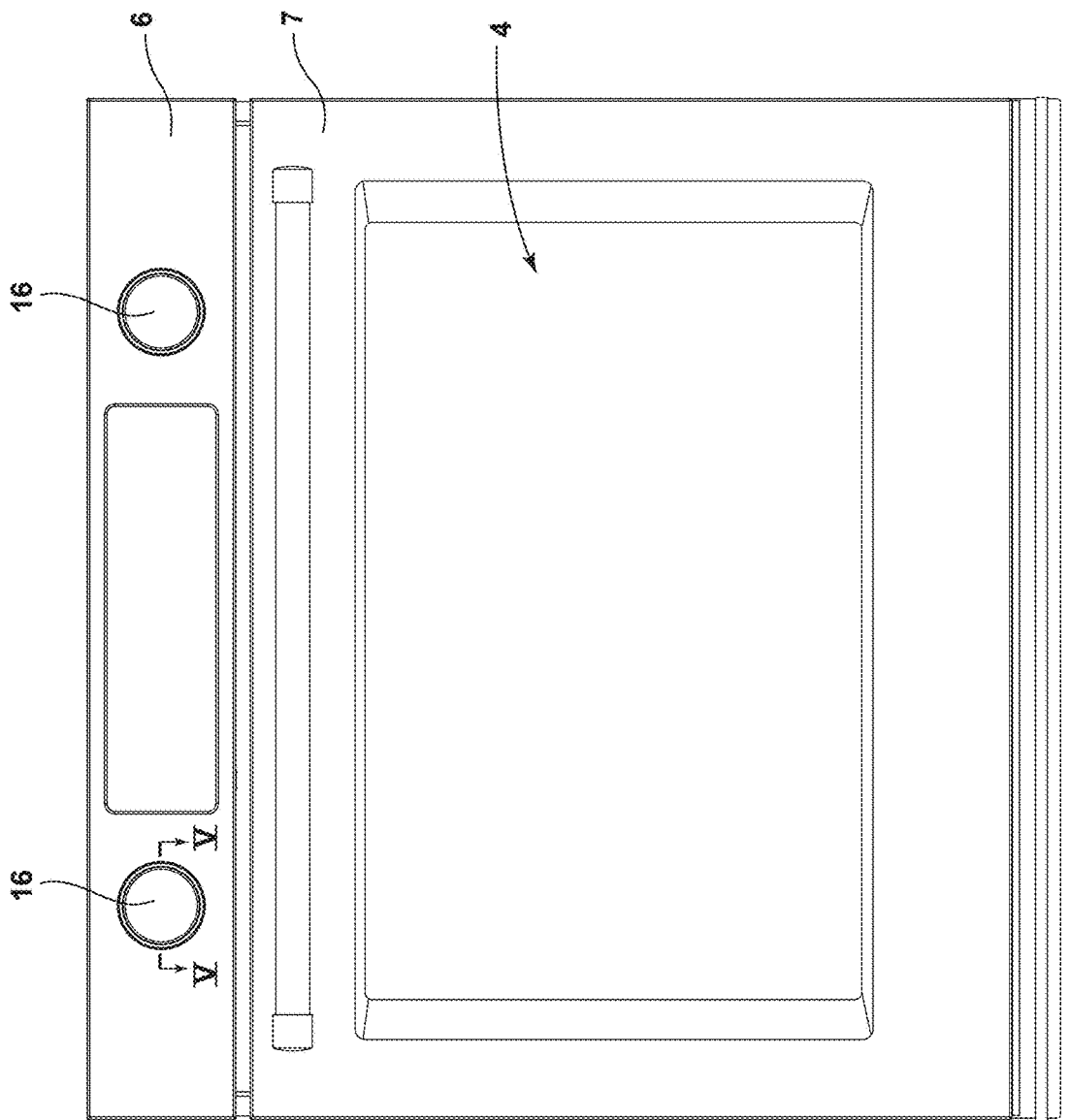
FIG. 1 is a front view of an appliance with a backlight knob assembly.
Figure 2:
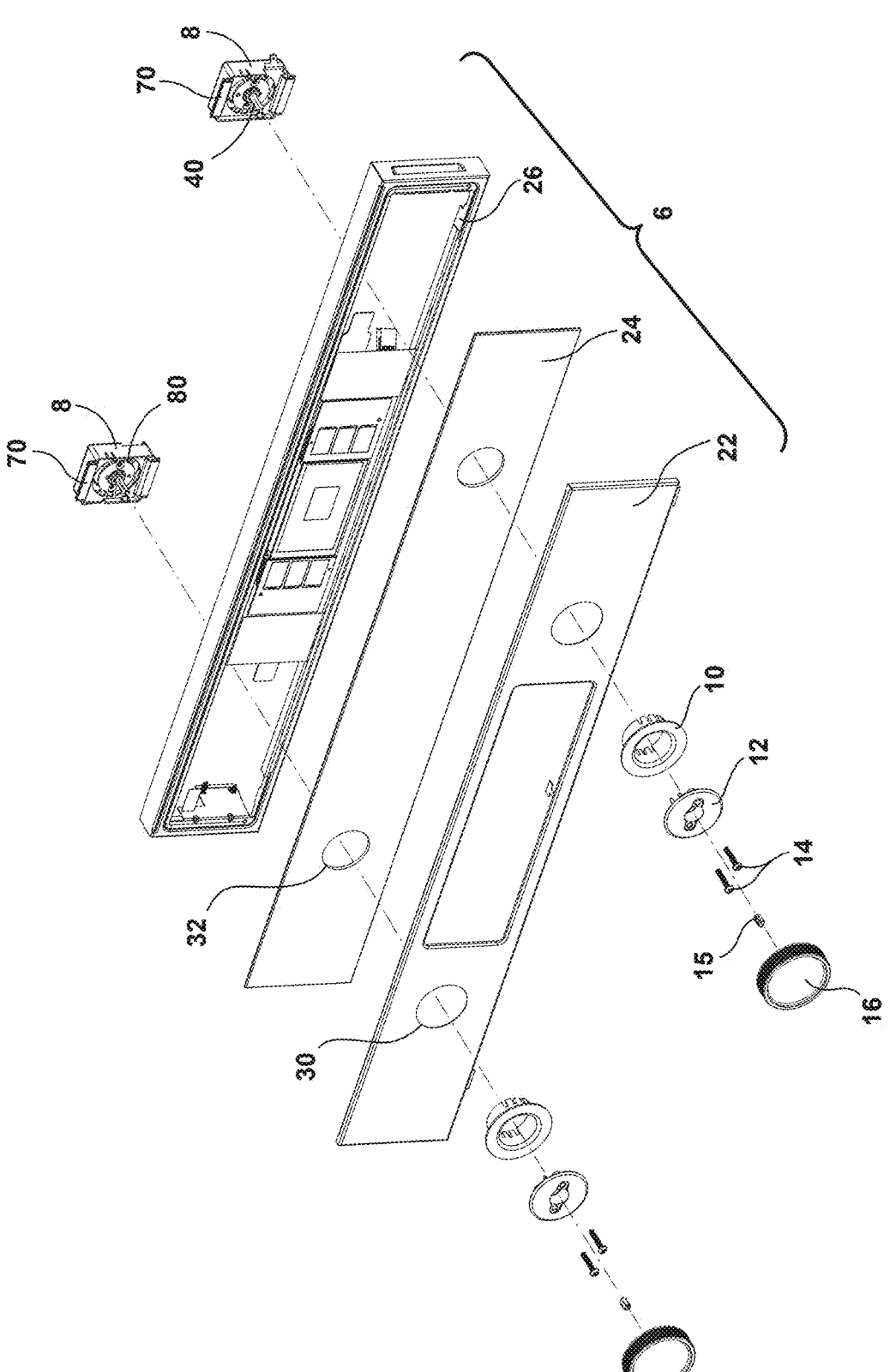
FIG. 2 is a front perspective view of the components of the backlight knob assembly and the console of the appliance.
Figure 3:
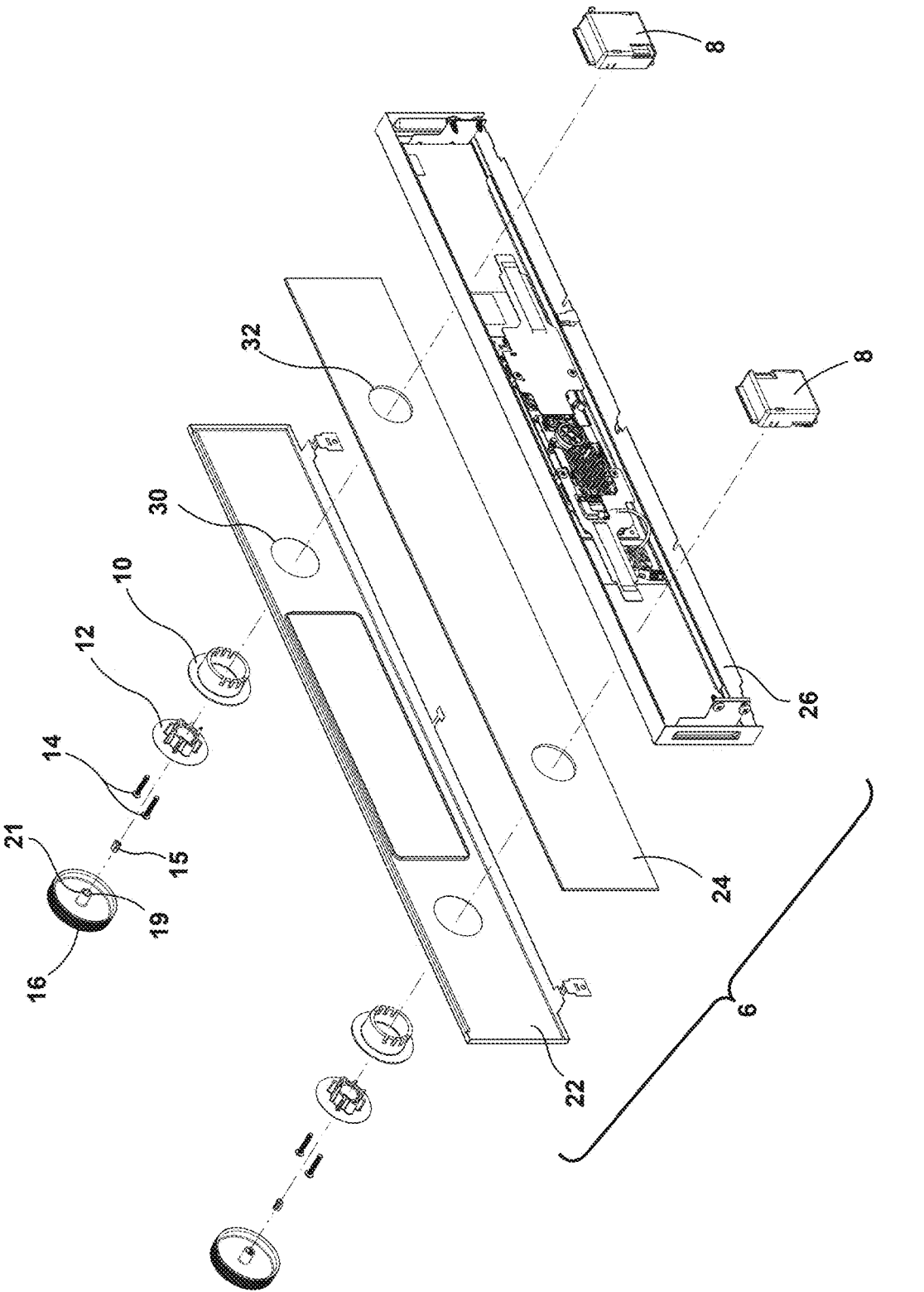
FIG. 3 is a rear perspective view of the components of the backlight knob assembly and the console of the appliance.

The components in the figures are not necessarily to scale, emphasis instead being placed upon illustrating the principles described herein.

DETAILED DESCRIPTION

The present illustrated embodiments reside primarily in combinations of method steps and apparatus components related to a backlight knob assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

A backlight knob assembly 2 is illustrated in FIGS. 1, 2, 3, 5, 8, and 9. The backlight knob assembly 2 can be used on an appliance 4. In the illustrated embodiment, the appliance 4 is an oven with a door 7 and control console 6. However, the backlight knob assembly 2 can be used on other appliances and can be used in areas other than control consoles.

Figure 6:
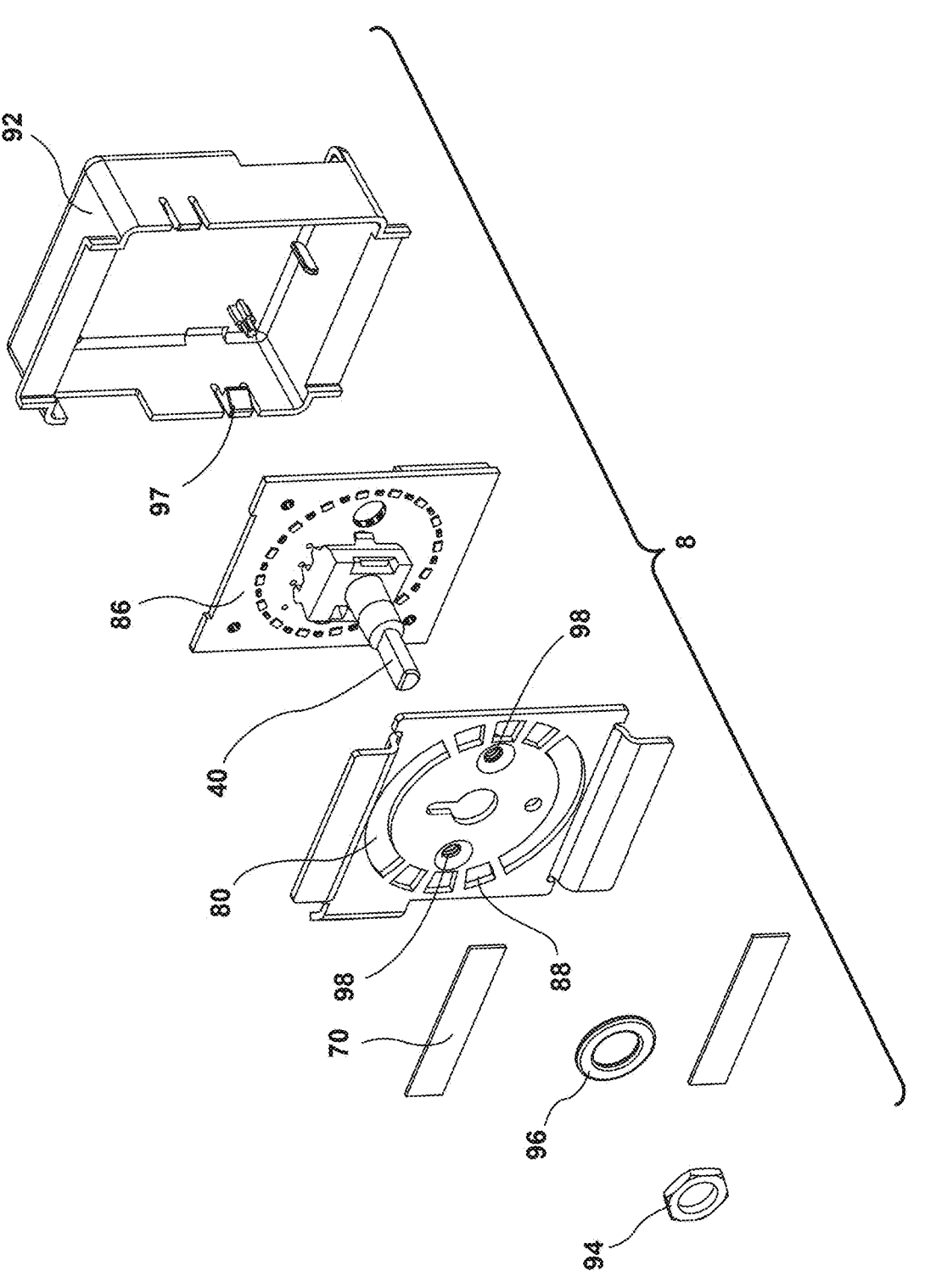
FIG. 6 is a front perspective view of the components of the encoder assembly.
Figure 7:
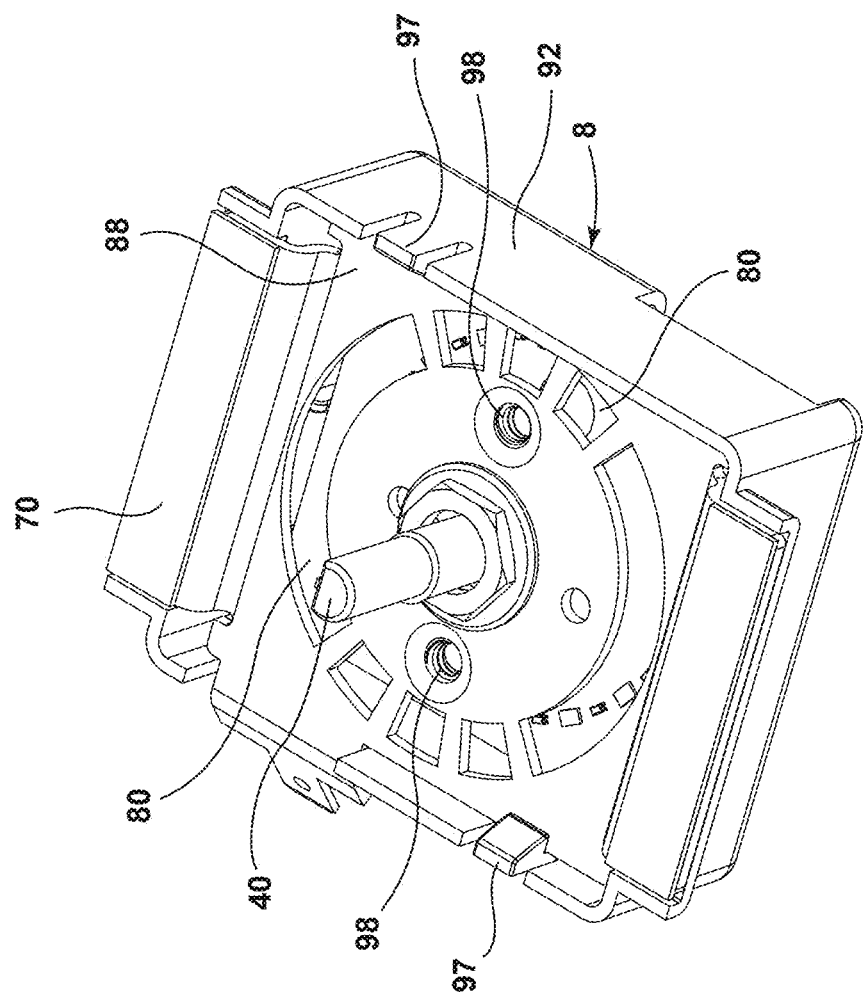
FIG. 7 is a front view of the encoder assembly.
Figure 8:
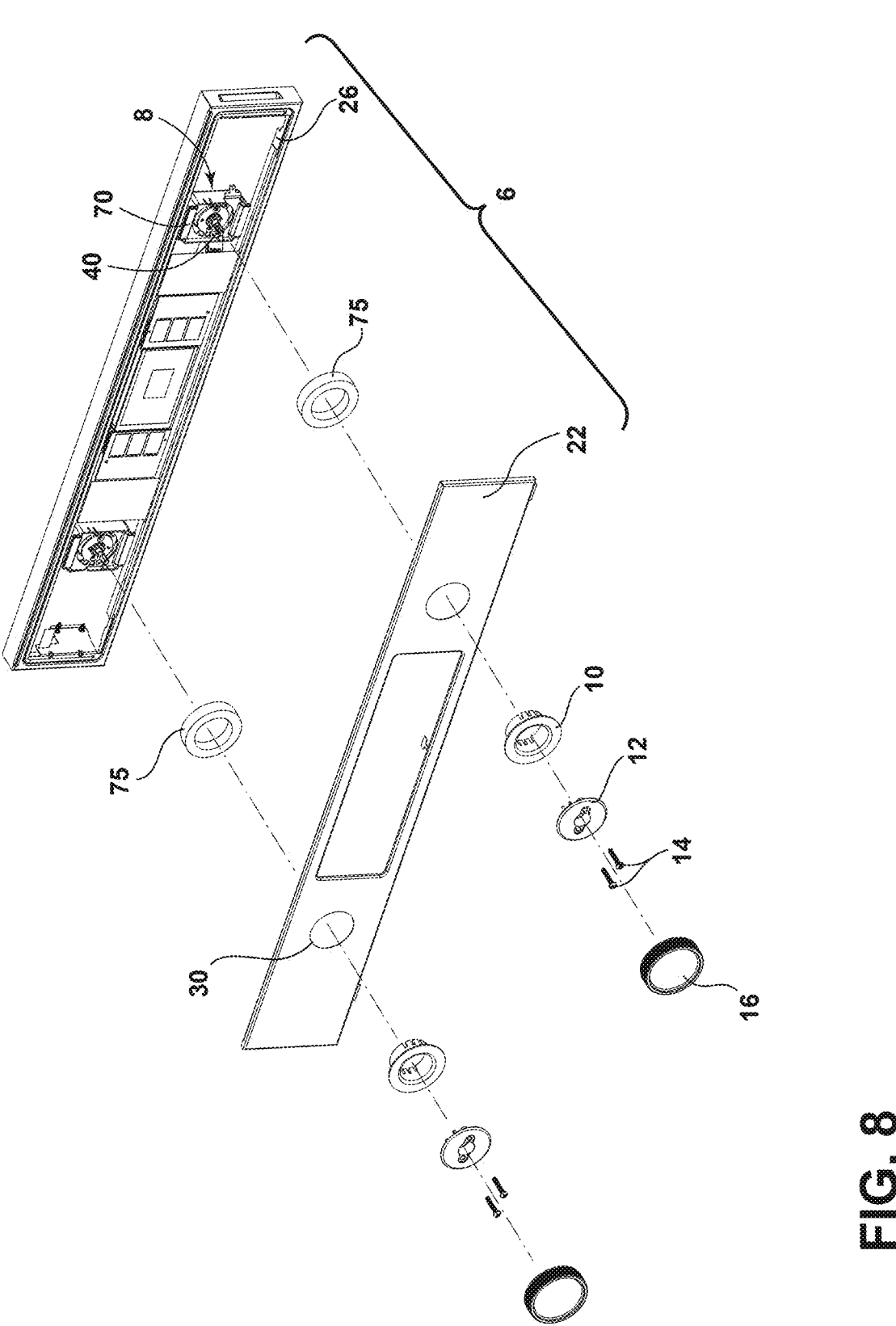
FIG. 8 is a front perspective view of the components of another embodiment of the backlight knob assembly and the console of the appliance.

The backlight knob assembly 2 includes an encoder assembly 8. The encoder assembly 8 has a light printed circuit board (PCB) 86, an encoder plate 88, and a cover 92 as illustrated in FIG. 6. The light PCB 86 can include a shaft 40. The encoder plate 88 is secured to the light PCB 86 by a nut 94 and washer 96 that couple to a threaded surface on the shaft 40. The encoder plate 88 has tapped openings 98. The light PCB 86 can be coupled to the cover 92 by snap tabs 97 or other mechanical means, adhesives, and/or fasteners.

The encoder assembly 8 is coupled to an inside surface of the appliance 4. In the illustrated embodiment, the encoder assembly 8 is coupled to the inside surface of a glass plate 24 of the control console 6. The control console 6 has an outer plate 22 that couples to the console housing 26 with the glass plate 24 positioned therebetween. The glass plate 24 and the outer plate 22 have light guide openings 32 and 30, respectively. The encoder assembly 8 can be coupled to the inside surface by mechanical and/or adhesive members. In the illustrated embodiment, double-sided tape 70 is used as an adhesive between the encoder assembly 8 and the glass plate 24 behind the light guide openings 32.

Figure 9:
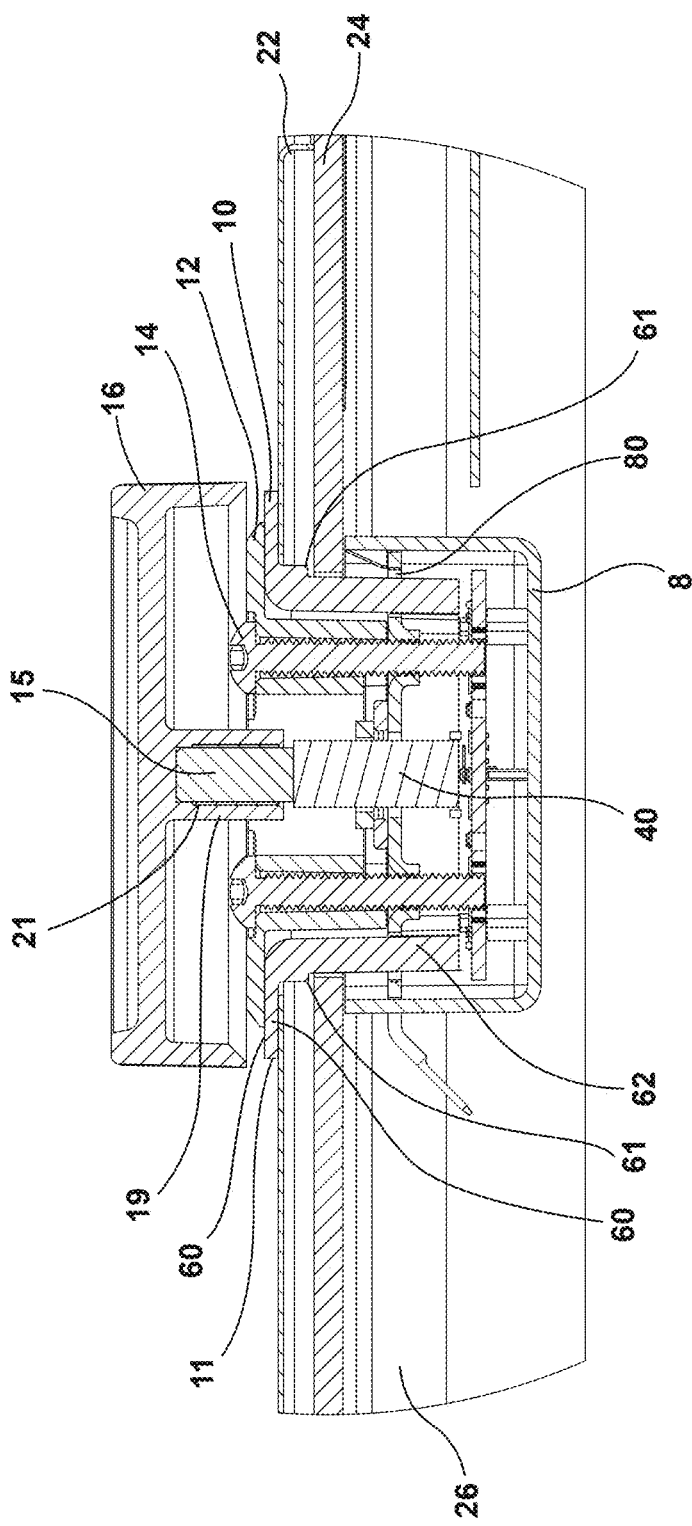
FIG. 9 is a partial cross-sectional view of the backlight knob assembly shown in FIG. 8.
Figure 10:
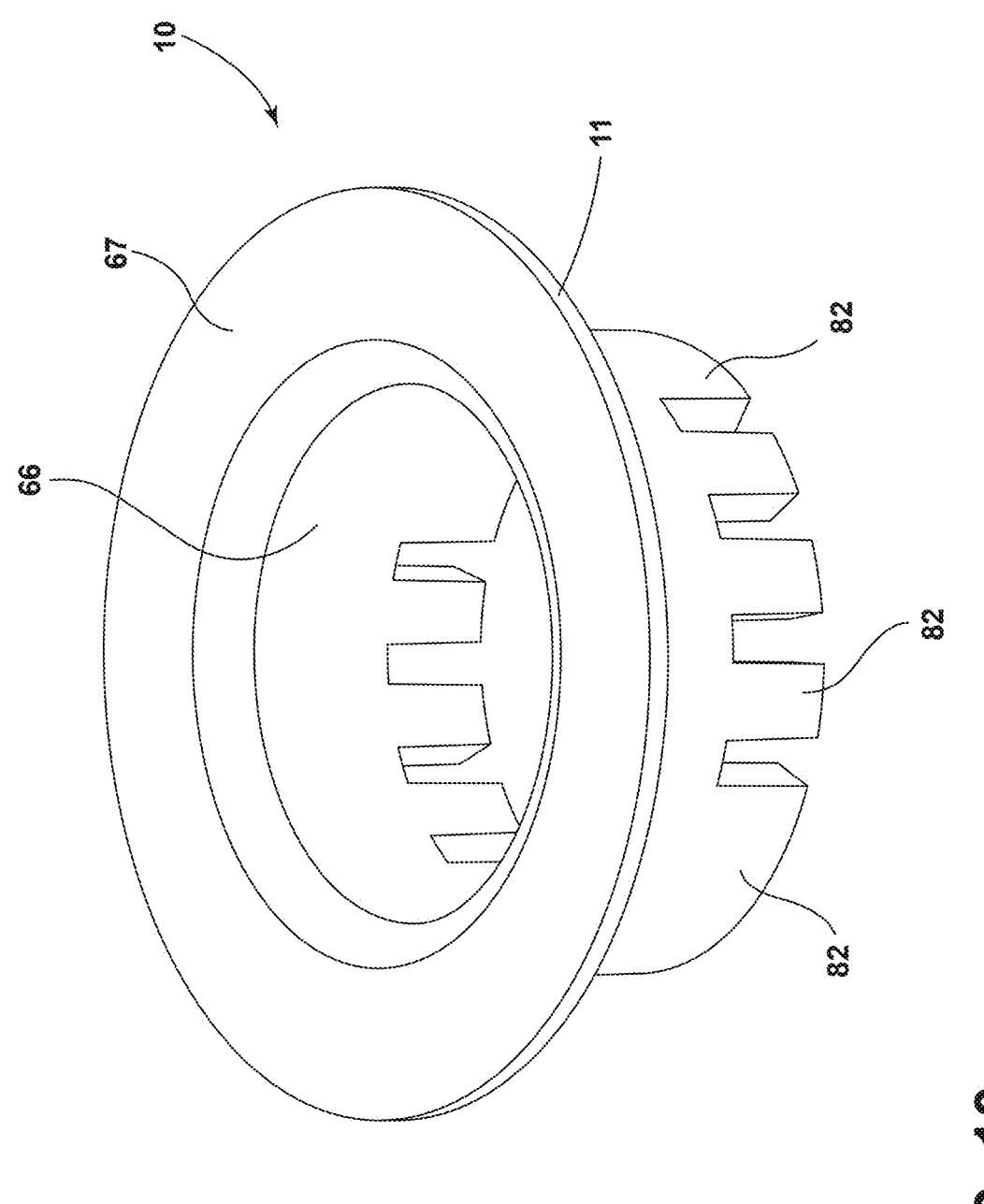
FIG. 10 is a top view of the light guide.

A light guide 10 is coupled to the encoder assembly 8. The light guide 10 extends through the light guide openings 30 and 32 in the outer plate 22 and glass plate 24 of the control console 6 to the encoder assembly 8. The light guide 10 has a plurality of slots 64 that are formed in the inner ring 62 of the light guide 10. In the illustrated embodiment, the slots 64 are positioned on opposite sides of the central opening 66 in the outer ring 60 of the light guide 10. Tabs 82 are formed in between the slots 64. The tabs 82 are received in corresponding openings 80 in the encoder assembly 8. In the illustrated embodiment, openings 80 are in the encoder plate 88. The outer ring 60 has an outer surface 67 and an inner surface 65, as shown in FIGS. 4A and 4B. The outer ring 60 has a wider diameter than the inner ring 62. The light guide 10 can include stepped surface 61 between the inner ring 62 and outer ring 60 as shown in FIG. 9. The stepped surface 61 can help reduce or eliminate the deformation on outer plate 22 if the fasteners are overtightened. Spacers 75 can be used to surround the opening 30 in the outer plate 22. The spacers 75 are positioned in between the outer plate 22 and the glass plate 24 to prevent deformation of the outer plate 22 when the fasteners 14 couple the outer encoder holder 12 to the encoder assembly 8. The spacers 75 can be made of a foam or flexible plastic material.

The light guide 10 includes surfaces for light inlet and outlet to transfer light from the light PCB 86. Thus, the light guide 10 can be made from a transparent, semi-transparent, translucent, or semi-translucent material. The light source can be any source of light. In the illustrated embodiment, the light source is a plurality of light emitting diodes (LEDs) arranged in a circle on the light PCB 86. The LEDs can be spaced to be behind tabs 82 so that the light passes through tabs 82 toward the outer ring 60 of the light guide 10. The light guide 10 can be painted, coated, or otherwise arranged to selectively transfer the light to certain regions of the light guide 10. For example, the light guide 10 can have the outer surface 67 of the outer ring 60 coated or painted black so that the lighter color of the light guide 10 is not visible behind the knob 14. The light guide 10 has a central opening 66. In the illustrated embodiment, the central opening 66 is clear or white to avoid light intensity loss and to help provide a uniform distribution of light behind the knob 16. The lateral edge 11 of the outer ring 60 can be clear or white to provide the backlight for knob 16.

An outer encoder holder 12 is coupled to the encoder assembly 8. The outer encoder holder 12 includes a central opening 52, an outer surface 58, and an inner surface 56. An extension member 59 extends from the inner surface 56 of the outer encoder holder 12, as shown in FIG. 4B. The extension member 59 includes a number of ridges 57 to help locate the outer encoder holder 12 in the central opening 66 of the light guide 10. The outer encoder holder 12 may also be coated and/or made of material that permits or prevents light to pass through to the outer surface 58.

The outer encoder holder 12 includes two spaced apart fastener openings 50. In the illustrated embodiment, the two spaced apart fastener openings 50 are located on opposites sides of the central opening 52, 180° from each other.

The fastener openings 50 are recessed from the outer surface 58 to permit the installation of fasteners 14 while allowing the head of the fasteners 14 to not extend beyond the outer surface 58 of the outer encoder holder 12. The fasteners 14 are received in openings 98 in the encoder assembly 8.

Figure 5:
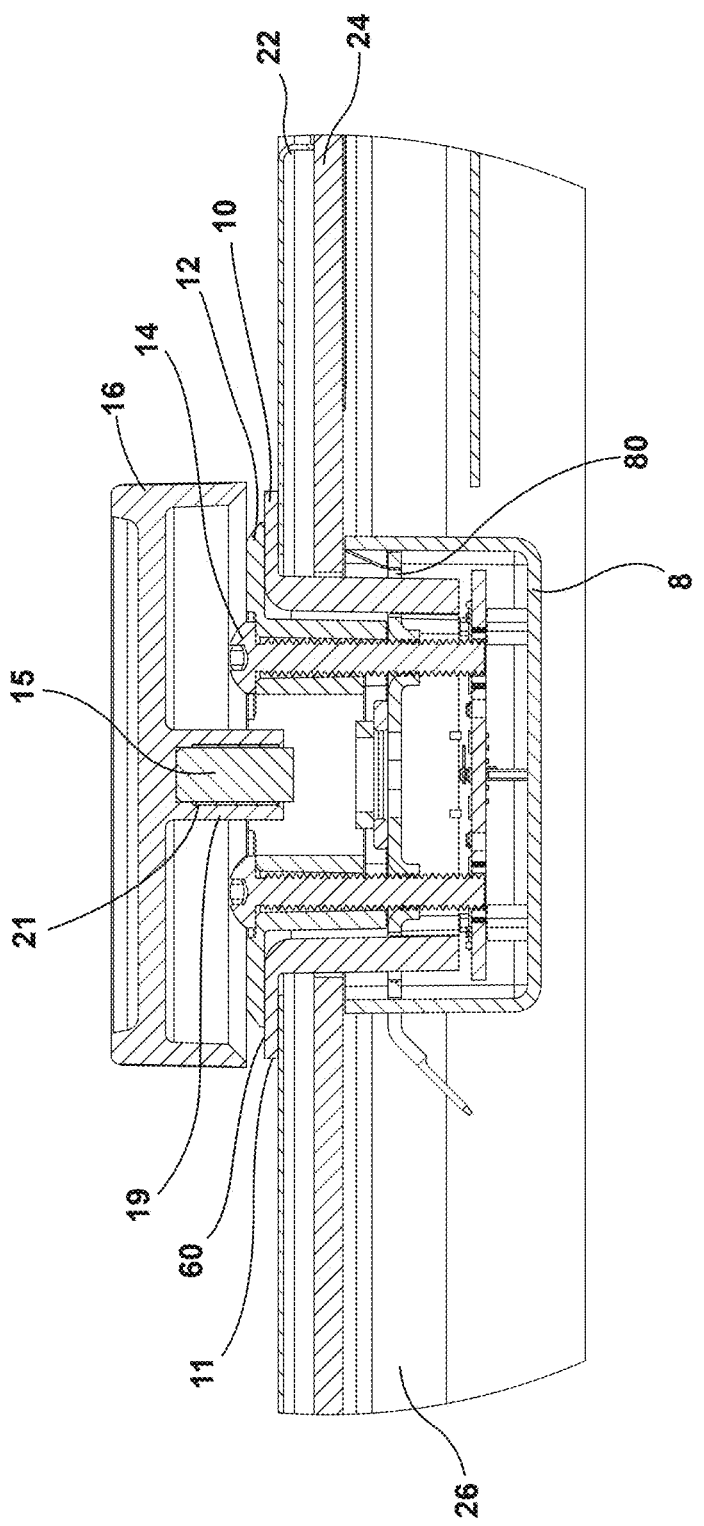
FIG. 5 is a partial cross-sectional view of the backlight knob assembly on a console taken along line V-V in FIG. 1.

A knob 16 is coupled to the shaft 40 on the encoder assembly 8. This permits the knob 16 to control the encoder in order to activate and/or alter features of the appliance 4, such as a heating element in the context of the illustrated oven. An extension member 15 can be used to help couple the knob 16 as illustrated in FIG. 5. The knob 16 can include dark surfaces to present a contrast to the backlight.

When assembled, the backlight knob assembly 2 allows the light guide 10 to transfer the light from the encoder assembly 8 to backlight the knob 16. The backlight knob assembly 2 is a sandwich-style assembly, as illustrated in FIGS. 2, 3, 5, 8, and 9.

According to another aspect of the disclosure, is backlight knob assembly for an appliance, comprising. The backlight knob assembly having an encoder and light source positioned in an encoder assembly that is coupled to an inside surface of the appliance adjacent to an opening. A light guide with an inner surface is positioned inside said opening in said appliance, said inner surface including a plurality of slots with tabs positioned in between said plurality of slots, said tabs being received in tab openings in said encoder assembly. The backlight knob assembly having an outer encoder holder having a plurality of fastener openings and a central opening, said outer encoder holder positioned adjacent to an outer surface of said light guide. One or more fasteners couple said outer encoder holder to said encoder assembly. A knob is coupled to a shaft on said encoder assembly.

According to another aspect, wherein said backlight knob includes an adhesive positioned between said encoder assembly and said inside surface of said appliance.

According to another aspect, wherein said adhesive includes a tape.

According to another aspect, wherein said surface of said appliance is a console.

According to another aspect, wherein said light guide has an outer surface with a diameter that is larger than the diameter of said outer encoder holder leaving an outer ring of said light guide uncovered by said outer encoder holder.

According to another aspect, wherein said one or more fasteners is a pair of fasteners spaced on opposite sides of said central shaft opening.

According to another aspect, wherein the outer surface of the light guide is painted black over white.

According to yet another aspect, is an appliance with a backlight knob assembly. The appliance having a console coupled to the appliance with a light guide opening. An encoder and light source are positioned in an encoder assembly that is coupled to an inside surface of the console adjacent to said light guide opening. A light guide with an inner surface is positioned inside said opening in said appliance, said inner surface including a plurality of tabs that are received in tab openings in said encoder assembly. The appliance having an outer encoder holder having a plurality of fastener openings, said outer encoder holder positioned adjacent to an outer surface of said light guide. One or more fasteners couple said outer encoder holder to tapped openings in said encoder assembly. A knob is rotatably coupled to said encoder assembly.

According to another aspect, the appliance including an adhesive positioned between said encoder assembly and said inside surface of said appliance.

According to another aspect, wherein said adhesive includes a section of tape.

According to another aspect, wherein said console includes a plate positioned between an outer plate and a housing for the console.

According to another aspect, wherein said light guide has an outer surface that is painted black over white.

According to another aspect, wherein said one or more fasteners is a pair of fasteners spaced on opposite sides of a central opening in said outer encoder holder.

According to another aspect, wherein said knob does not permit light to pass through the material of the knob.

According to yet another aspect is a backlight knob assembly for an appliance. The backlight knob assembly having an encoder and light source positioned in an encoder assembly that is coupled to an inside surface of the appliance adjacent to a light guide opening. A light guide with an inner surface is positioned inside said light guide opening in said appliance, said light guide including a plurality of tabs that are received in a plurality of tab openings in said encoder assembly. The backlight knob having an outer encoder holder having a plurality of fastener openings, said outer encoder holder positioned adjacent to an outer surface of said light guide, leaving an outer ring of said light guide exposed. One or more fasteners couple said outer encoder holder to said encoder assembly. A knob is coupled to said encoder assembly.

According to another aspect, the backlight knob assembly including an adhesive positioned between said encoder assembly and said inside surface of said appliance.

According to another aspect, wherein said outer encoder holder includes an extension member that is received in a central opening said light guide.

According to another aspect, wherein said surface of said appliance is a console.

According to another aspect, wherein said one or more fasteners is a pair of fasteners spaced on opposite sides of a central shaft opening.

According to another aspect, wherein an outer surface of said light guide is painted black over white.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A backlight knob assembly for an appliance, comprising:

an encoder and light source positioned in an encoder assembly that is coupled to an inside surface of the appliance adjacent to an opening;

a light guide with an inner surface is positioned inside said opening in said appliance, said inner surface including a plurality of slots with tabs positioned in between said plurality of slots, said tabs being received in tab openings in said encoder assembly;

an outer encoder holder having a plurality of fastener openings and a central opening, said outer encoder holder positioned adjacent to an outer surface of said light guide;

one or more fasteners that couples said outer encoder holder to said encoder assembly; and a knob coupled to a shaft on said encoder assembly.

2. The backlight knob assembly of claim 1, including an adhesive positioned between said encoder assembly and said inside surface of said appliance.

3. The backlight knob assembly of claim 2, wherein said adhesive includes a tape.

4. The backlight knob assembly of claim 1, wherein said surface of said appliance is a console.

5. The backlight knob assembly of claim 1, wherein said light guide has an outer surface with a diameter that is larger than the diameter of said outer encoder holder leaving an outer ring of said light guide uncovered by said outer encoder holder.

6. The backlight knob assembly of claim 1, wherein said one or more fasteners is a pair of fasteners spaced on opposite sides of said central shaft opening.

7. The backlight knob assembly of claim 1, wherein the outer surface of the light guide is painted black over white.

8. An appliance with a backlight knob assembly, comprising:

a console coupled to the appliance with a light guide opening;

an encoder and light source positioned in an encoder assembly that is coupled to an inside surface of the console adjacent to said light guide opening;

a light guide with an inner surface positioned inside said opening in said appliance, said inner surface including a plurality of tabs that are received in tab openings in said encoder assembly;

an outer encoder holder having a plurality of fastener openings, said outer encoder holder positioned adjacent to an outer surface of said light guide;

one or more fasteners that couples said outer encoder holder to tapped openings in said encoder assembly; and a knob rotatably coupled to said encoder in said encoder assembly.

9. The appliance of claim 8, including an adhesive positioned between said encoder assembly and said inside surface of said appliance.

10. The appliance of claim 9, wherein said adhesive includes a section of tape.

11. The appliance of claim 8, wherein said console includes a plate positioned between an outer plate and a housing for the console.

12. The appliance of claim 8, wherein said light guide has an outer surface that is painted black over white.

13. The appliance of claim 8, wherein said one or more fasteners is a pair of fasteners spaced on opposite sides of a central opening in said outer encoder holder.

14. The appliance of claim 8, wherein said knob does not permit light to pass through the material of the knob.

15. A backlight knob assembly for an appliance, comprising:

an encoder and light source positioned in an encoder assembly that is coupled to an inside surface of the appliance adjacent to a light guide opening;

a light guide with an inner surface positioned inside said light guide opening in said appliance, said light guide including a plurality of tabs that are received in a plurality of tab openings in said encoder assembly;

an outer encoder holder having a plurality of fastener openings, said outer encoder holder positioned adjacent to an outer surface of said light guide, leaving an outer ring of said light guide exposed;

one or more fasteners that couples said outer encoder holder to said encoder assembly; and a knob coupled to said encoder assembly.

16. The backlight knob assembly of claim 15, including an adhesive positioned between said encoder assembly and said inside surface of said appliance.

17. The backlight knob assembly of claim 15, wherein said outer encoder holder includes an extension member that is received in a central opening said light guide.

18. The backlight knob assembly of claim 15, wherein said surface of said appliance is a console.

19. The backlight knob assembly of claim 15, wherein said one or more fasteners is a pair of fasteners spaced on opposite sides of a central shaft opening.

20. The backlight knob assembly of claim 15, wherein an outer surface of said light guide is painted black over white.

* * * * *